No. 678,875. Patented July 23, 1901.
J. A. HEANY.
ELECTRIC MOTOR.
(Application filed Nov. 19, 1900.)
(No Model.)
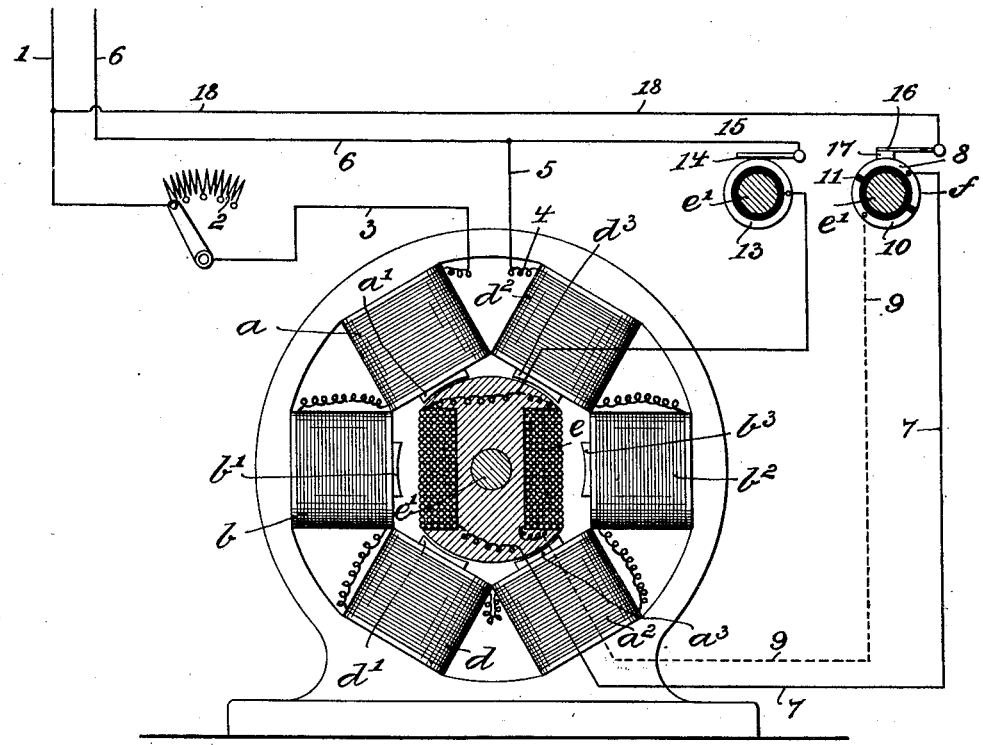
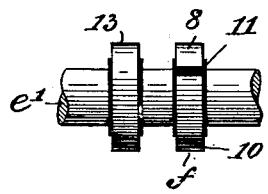

United States Patent Office.

JOHN A. HEANY, OF PHILADELPHIA, PENNSYLVANIA, ASSIGNOR TO THE TETER-HEANY DEVELOPING COMPANY, OF SAME PLACE AND CHARLESTON, WEST VIRGINIA.

ELECTRIC MOTOR.

SPECIFICATION forming part of Letters Patent No. 678,875, dated July 23, 1901.

Application filed November 19, 1900. Serial No. 36,960. (No model.)

*To all whom it may concern:*

Be it known that I, JOHN A. HEANY, a citizen of the United States, residing at the city of Philadelphia, in the county of Philadelphia and State of Pennsylvania, have invented certain new and useful Improvements in Electric Motors, of which the following is a specification.

My invention has relation to an electric motor; and in such connection it relates to an improvement upon the motor described and claimed in a companion application for a patent filed by me of even date herewith under Serial No. 36,959.

In my other application for a patent I have described an electric motor wherein a simply-wound armature is surrounded by a series of field-magnets each of which is divided into two sections or poles oppositely and diametrically disposed. The field-magnet sections are each wound with two oppositely-arranged windings, and by means of a commutator the main current may be thrown into one or the other or into both windings to either reverse the polarity of the section or to render its pole neutral.

In my present application the field-magnets have been divided into two sections or poles and wound with a single winding, so that the polarity of each section remains uniform and unchanged. The armature, however, is wound with two oppositely-arranged windings, and by means of a commutator one or the other or both windings may be brought into the main circuit, and thereby the polarity of each pole of the armature may be reversed or neutralized.

The nature and scope of my invention will be more fully understood from the following description, taken in connection with the accompanying drawings, forming part hereof, in which—

Figure 1 is a diagrammatic view illustrating the construction and arrangement of the parts of a motor embodying main features of my invention and also illustrating the circuits in said motor, and Fig. 2 is a top or plan view of a portion of the motor-shaft and of the contact and commutator rings thereon.

Referring to the drawings, the current from one branch 1 of the main circuit leads through the rheostat 2 to a wire 3, which is wound in one direction about the cores or poles $a'$, $b'$, and $d'$ of three magnet-sections $a$, $b$, and $d$ to give to said cores a positive polarity and is then wound in an opposite direction upon the cores or poles $a^3$, $b^3$, and $d^3$ of the three opposite magnet-sections $a^2$, $b^2$, and $d^2$ to give a negative polarity to said cores. The wire finally emerges at 4 from the magnet-section $d^2$ and thence passes by wire 5 to the return 6 of the main circuit. These magnet-sections surround an armature $e$, having two coils oppositely disposed to each other. One coil is connected by a wire 7 with a segment 8 of a commutator $f$, preferably located on the shaft $e'$ of the armature $e$. The other winding leads by the dotted wire 9 to a segment 10 of the commutator $f$. The two segments 8 and 10 are insulated from each other at the points 11. The return of both windings of the armature leads by a common wire 12 to a contact-ring 13, also preferably located on the armature-shaft $e'$. On the ring 13 rests a contact-finger 14, connected by the wire 15 with the return 6 of the main circuit. Near the segmental commutator $f$ is arranged a finger 16, having a block 17 resting upon the periphery of the commutator. The width of the block 17 is wider than the strips 11 of insulation between the segments 8 and 10, so that as the commutator rotates the block 17 can span or bridge these points, and thus connect both segments with the block 17 and finger 16. The finger 16 is connected by the wire 18 with the branch 1 of the main circuit.

From the foregoing description it will be understood that as the commutator $f$ rotates the current from the branch 1 of the main circuit will be either commutated through the segment 8 or 10 to either wire 7 or 9 when the block 17 rests upon either segment 8 or 10, and hence the current flowing through the armature $e$ will be either in one direction or the other. As it changes in direction the poles of the armature will be changed or reversed. When, however, the block 17 bridges the two segments 8 and 10, then two opposite currents will flow through the windings of the armature *e* and the armature-poles will both be neutral.

Having thus described the nature and object of my invention, what I claim as new, and desire to secure by Letters Patent, is—

1. In an electric motor, a series of field-magnets each divided into two diametrically opposite sections of constant opposing polarities, an armature surrounded by the field-magnets and having two oppositely-arranged core-windings, and a commutator adapted to bring either or both windings of the armature into the main circuit to reverse or neutralize the two poles of the armature, substantially as and for the purposes described.

2. In an electric motor, a series of field-magnets, each divided into two diametrically opposite sections and each section oppositely wound to the complemental section to secure constant opposing polarities in the sections, an armature surrounded by the field-magnet sections and having two oppositely-arranged core-windings, a main circuit, a common return-wire connecting both windings with one branch of the main circuit, a commutator-ring arranged in two segments insulated from each other, a contact finger and block connected with the other branch of the main circuit, said block resting upon the segments and adapted to bridge the insulating portions thereof, a connection leading from one segment to one winding of the armature and another connection leading from the other segment to the other armature-winding, substantially as and for the purposes described.

In testimony whereof I have hereunto set my signature in the presence of two subscribing witnesses.

JOHN A. HEANY.

Witnesses:
J. WALTER DOUGLASS,
THOMAS M. SMITH.